(12) United States Patent
Peng et al.

(10) Patent No.: US 7,796,671 B2
(45) Date of Patent: Sep. 14, 2010

(54) MULTI-PASS OPTICAL POWER AMPLIFIER (75) Inventors: Xiaoyuan Peng, Portland, OR (US);
Wensheng Ren, Beaverton, OR (US)

(73) Assignee: Electro Scientific Industries, Inc.,
Portland, OR (US)

( * ) Notice: Subject to any disclaimer, the term of this patent is extended or adjusted under 35 U.S.C. 154(b) by 352 days.

(21) Appl. No.: 12/059,955

(22) Filed: Mar. 31, 2008

(65) Prior Publication Data

US 2009/0245304 A1     Oct. 1, 2009

(51) Int. Cl.
    *H01S 3/09*     (2006.01)
(52) U.S. Cl. .......................................... 372/92; 372/93
(58) Field of Classification Search .................. 372/20, 372/29.02, 18, 93, 22
    See application file for complete search history.

(56) References Cited

U.S. PATENT DOCUMENTS

| | | | | |
|---|---|---|---|---|
| 5,048,030 A | * | 9/1991 | Hiiro | 372/68 |
| 5,172,263 A | | 12/1992 | Hale | |
| 5,268,787 A | * | 12/1993 | McIntyre | 359/347 |
| 5,546,222 A | | 8/1996 | Plaessmann et al. | |
| 5,651,019 A | * | 7/1997 | Goldberg et al. | 372/68 |
| 6,384,966 B1 | | 5/2002 | Dymott | |
| 6,700,698 B1 | | 3/2004 | Scott | |
| 7,386,019 B2 | * | 6/2008 | Klimov et al. | 372/18 |

OTHER PUBLICATIONS

Peng, Xiaoyuan; Xu, Lei; and Asundi, Anand; "Power Scaling of Diode-Pumped Nd:YVO4 Lasers," IEEE Journal of Quantum Electronics, vol. 38, No. 9, Sep. 2002, pp. 1291-1299.

Frede, Maik; Schulz, Bastian; Wilhelm, Ralf; Kwee, Patrick; Seifert, Frank; Willke, Benno; and Kracht, Dietmar; "Fundamental Mode, Single-frequency Laser Amplifier for Gravitational Wave Detectors," Optics Express, vol. 15, No. 2, Jan. 22, 2007, 459-465.

Lu, Q.; Kugler, N.; Weber, H.; Dong, S.; Muller, N.; and Wittrock, U.; "A Novel Approach for Compensation of Birefringence in Cylindrical Nd:YAG Rods," Optical and Quantum Electronics 28, (1996) 57-69.

International Search Report, International Patent Application No. PCT/US2009/037719, dated Oct. 30, 2009, 3 pages, and Written Opinion, dated Oct. 30, 2009, 4 pages.

* cited by examiner

*Primary Examiner*—Minsun Harvey
*Assistant Examiner*—Tuan Nguyen
(74) *Attorney, Agent, or Firm*—Stoel Rives LLP (57) ABSTRACT

Anisotropic crystals such as $Nd:YVO_4$, Nd:YLF, and $Nd:GdVO_4$ have become preferred gain materials for many laser applications. The anisotropic gain medium without ancillary compensation ensures there is no degradation of laser modes when passing through the gain medium. An optical power amplifier that incorporates an anisotropic gain medium achieves power scaling with multiple passes while also maintaining good mode matching between the laser and the pump during each pass. Preferred embodiments implement for multiple passes of a seed laser beam through an anisotropic gain medium with substantially zero angular beam displacement during each pass. The multi-pass system provides an economical, reliable method of achieving high $TEM_{00}$ power to meet the demands of micromachining, via drilling, and harmonic conversion applications.

17 Claims, 12 Drawing Sheets

MULTI-PASS OPTICAL POWER AMPLIFIER

COPYRIGHT NOTICE

© 2008 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

The present disclosure relates to a solid state laser amplifier used in high power applications.

BACKGROUND INFORMATION

Fiber and semiconductor lasers and diode-pumped solid-state (DPSS) pulsed lasers with output power in the range of several Watts to tens of Watts are applied primarily in laser micromachining in the field of electronic device manufacturing. Micromachining applications require a high pulse repetition frequency (PRF), corresponding to laser pulse durations ranging from nanoseconds to picoseconds, and even femtoseconds. Typical laser output wavelengths range from infrared to ultraviolet. The performance of traditional solid-state lasers that rely on a simple master oscillator is falling behind the overall pace of laser system technology development, primarily because of limited pulse repetition rate and power scaling by a single oscillator.

Figure 1:
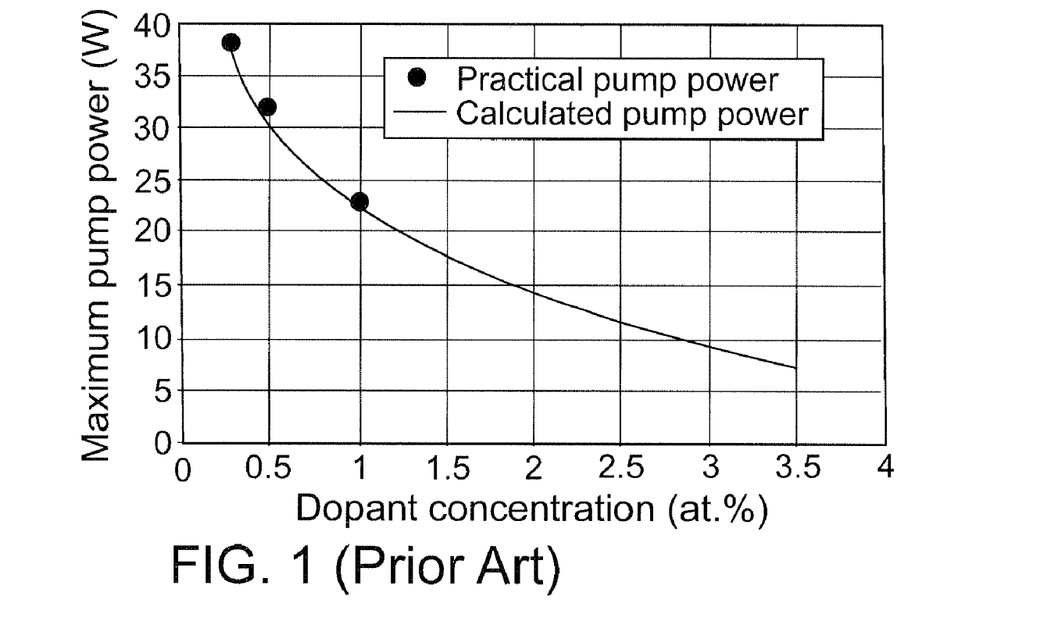
FIG. 1 is a graph comparing calculated and measured values of maximum pump power as a function of doping concentration for a prior art vanadate laser pumped at 808 nm.

As is well known to those skilled persons, progress in power scaling of a $TEM_{00}$ laser mode has been limited by the formation of aberrated thermal lenses within the active lasing medium. A thermal lens is mainly caused by a temperature gradient in a laser crystal and results in a distortion of the index of refraction of the crystal in response to non-uniform pump power. Peng, Xu, and Asundi, "Power Scaling of Diode-Pumped Nd:$YVO_4$ Lasers," *IEEE-Quantum Electronics, Vol. 38, No. 9*, 2002, demonstrate that maximum pump power varies inversely with doping concentration, and that the pump power increases to only 40 W for a 0.3% doped vanadate crystal using an 808 nm pump wavelength and a 0.8 mm diameter pump spot size. FIG. 1 is a graph showing maximum pump power as a function of doping concentration for an 808 nm-pumped laser. In addition to thermal lens formation, the maximum incident pump power is restricted by thermal fracture of the laser crystal. To date, the highest output power achieved for a $TEM_{00}$ mode narrow bandwidth and linearly polarized beam generated by an end-pumped vanadate laser is less than 30 W, while a power level of about 100 W is desirable. Currently, nanosecond pulsed fiber lasers are limited to generating peak power exceeding 1 kW with a $TEM_{00}$ mode because of stimulated Brillouin scattering (SBS) and damage issues.

One way to meet the demand for a high power laser source is to use a laser power amplifier. An advantage of laser power amplifiers is that the final power output may be easily scaled to meet a specific requirement for each different application. Laser power amplifiers also may be paired with different seed laser sources to allow flexibility in seed laser design and manufacturing. However, maintaining a high quality beam and stable output in a laser power amplifier remains a technical challenge.

Figure 2:
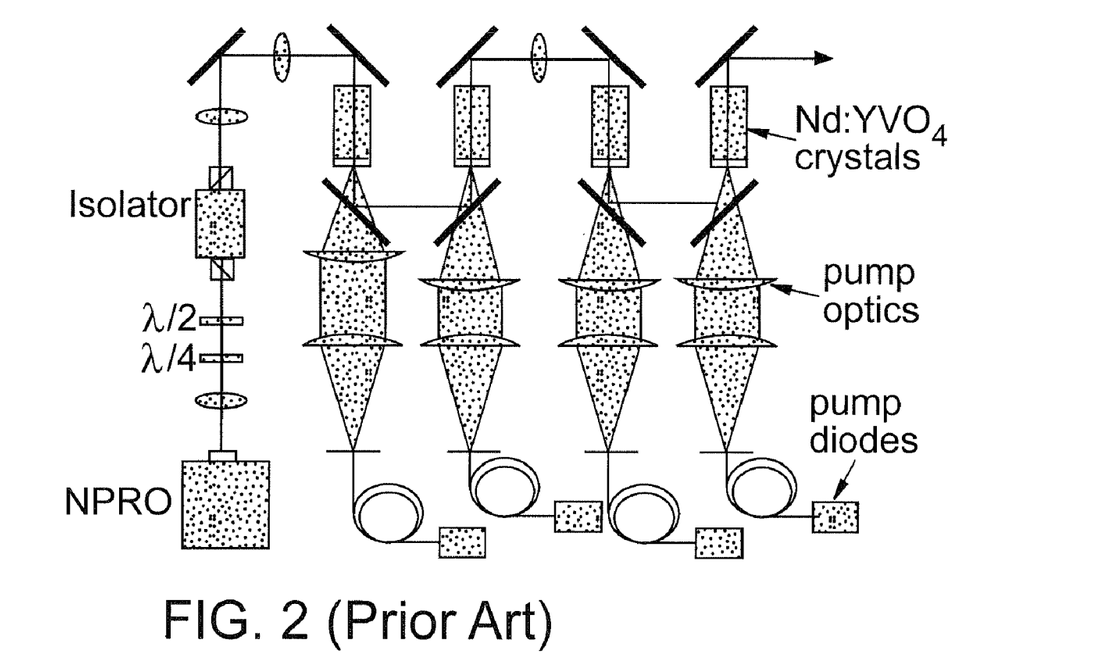
FIG. 2 is a diagram of a prior art four-stage amplifier design described by Frede et al.

A typical laser power amplifier uses a single-pass configuration, meaning that the seed laser beam passes once through the gain medium. One example is presented in Maik Frede et al., "Fundamental mode, single-frequency laser amplifier for gravitational wave detectors," *Optics Express, Vol. 15, No. 2*, 2007. A single-pass, four-stage amplifier described in the Maik Frede et al. paper and diagrammed in FIG. 2, extracted only 3 W from an amplifier with a 1 W seed laser and 45 W of pump power, which yields an optical-to-optical efficiency of 6.7%. Even state of the art single-pass power amplifiers typically exhibit a low extraction efficiency or a high (40%-60%) optical conversion rate from a diode laser pumping light source. However, a typical diode end-pumped vanadate laser oscillator has 40%-60% optical-to-optical conversion efficiency.

A method of improving the energy extraction efficiency entails guiding the laser beam back through the gain material multiple times, thereby compounding the gain until the desired power amplification is achieved. A typical multi-pass amplifier produces much more gain than does a single-pass amplifier. Suitable applications for a multi-pass power amplifier include semiconductor device link processing (IR, green and UV tailored pulse), laser micromachining (picosecond pulse amplification), and via drilling (high-power IR, green, and UV laser). U.S. Pat. No. 5,546,222, of Plaessmann et al. describes several embodiments of a multi-pass light amplifier, four of which embodiments are presented in FIG. 3. The Plaessmann et al. patent demonstrates, using a Nd:YLF twelve-pass amplifier at 10 kHz, that 2.5 µJ of energy was amplified to 45 µJ with 1.6 W of pump energy focused in the amplifier gain medium. As is typical for traditional multi-pass configurations, a large gain, in this case, twenty-fold, is achieved at the expense of beam quality.

A number of patents describe multi-pass amplifiers, but all of them share the problem of laser beam displacement within the gain medium, which displacement has two inherent, serious drawbacks. The first is that the pumped region must be sufficiently large to contain all the laser modes in different passes; otherwise, the result is low efficiency mode matching between the laser and the pump. Second, a non-uniform pump distribution in the gain medium, such as the so-called "super Gaussian" mode, causes distortion in laser beam power distribution with each pass, ultimately resulting in degradation of laser beam quality. Therefore, similar to a laser cavity with thermal lensing, compensation optics are needed to optimize laser output with higher beam quality. In addition, these multi-pass amplifiers generally require a fairly complicated optical setup, possibly even specially shaped optical elements. More important, multi-pass laser beams normally share the same two or three optical elements, making it fairly difficult to control the influence of thermal lensing. This especially causes problems in high-power applications because each pass modifies the laser beam parameters.

U.S. Pat. No. 5,268,787 of McIntyre describes a method and an apparatus for multi-pass laser amplifiers but does not address thermal depolarization issues and unwanted lasing in the amplifier. It also fails to address how the gain material, the key component of a laser power amplifier, affects performance of the laser amplifier when pumped by a high power light source. In the case of YAG solid state lasers, high power pumping induces significant thermal birefringence, causing orthogonal polarization directions to exhibit different gain in such a setup. Thermally induced birefringence in YAG rods under strong optical pumping has been observed, reported, and analyzed in numerous articles. Q. Lu et al., "A novel approach for compensation of birefringence in cylindrical Nd:YAG rods," *Optical Quantum Electronics, Vol. 28*, pp.

57-69, 1996, showed that 25% of optical power was lost through laser beam depolarization caused by thermal birefringence. Q. Lu et al. report that a carefully designed compensation method reduced the power loss to just 5%. Thus, it would seem that controlling and compensating for thermal birefringence in laser amplifiers is necessary and important.

U.S. Pat. No. 6,384,966 of Dymott addresses this power loss problem by rearranging optical components of a previous laser amplifier design to compensate for thermal birefringence, while passing the laser beam multiple times through the gain medium. For example, in the Dymott patent, a quarter-wave plate is placed between the gain medium and a first reflecting mirror. The Dymott patent specifies that the quarter-wave plate be oriented such that linearly polarized beam emerging from a Faraday rotator pass through the quarter-wave plate without undergoing any phase retardation. However, because of thermally induced birefringence, light passing once through the gain material generally becomes elliptically polarized. Upon two passes through the quarter-wave plate, the rotation direction of the elliptical polarization is reversed, and the thermally induced birefringence in the gain material is compensated.

The Dymott patent describes use of additional optical components in the design of the optical power amplifier to address other issues. For example, a 450 polarization rotator, or "Faraday rotator," is needed in this amplifier to separate amplified light from incident seed light. But the Faraday rotators (reference numerals 2, 4, 23, and 73 in FIGS. 1-5 of the Dymott patent) are placed in a region where the laser beam spot size is difficult to control, potentially causing damage in the case of high-average-power and high-peak-power applications. Another example is the placement of a pair of concave and convex mirrors on either side of each laser crystal to construct an unstable cavity to eliminate undesired lasing action.

In addition, the strong thermal lens in high-power applications acts as a major lens in the amplifier, contributing to instability of the cavity. As is well-known, the degree of thermal lensing varies with PRF, cooling temperature, and pump power. Multi-pass power amplifiers described in the Dymott patent are fabricated from Nd:YAG, an isotropic gain medium that is subject to depolarization effects. The Dymott patent points out that gain materials may include Nd:YAG, Nd:YVO$_4$, Nd:YLF, or Ti:sapphire to compensate for thermally induced birefringence, by design.

SUMMARY OF THE DISCLOSURE

The Dymott patent fails to recognize that anisotropic gain materials, including Nd:YVO$_4$ and Nd:YLF, exhibit an intrinsic benefit in that they themselves are naturally birefringent, so adding a component to compensate for thermal birefringence is unnecessary in preferred embodiments disclosed. For example, if a seed laser beam polarized along the c-axis of a Nd:YVO$_4$ crystal passes through an Nd:YVO$_4$ amplifier crystal, the effect of depolarization on the incident linearly polarized light is negligible. Adding an extra component in a high power laser amplifier increases the cost and the risk of optical damage, while it deteriorates the quality of the amplified beam. Moreover, configurations shown in the Dymott patent drawings cannot benefit from anisotropic gain materials such as Nd:YLF because the emission wavelengths are not the same in all directions. Emission along the a-axis is at 1047 nm, whereas emission along the c-axis is at 1053 nm. Double-pass and quadruple-pass amplifiers have, therefore, effective amplification functions equal to those of single-pass and double-pass amplifiers, respectively.

None of the above-mentioned patents pertaining to laser power amplifiers explores the use of anisotropic laser gain media. In the past few decades, anisotropic crystals such as Nd:YVO$_4$, Nd:YLF, and Nd:GdVO$_4$ have become preferred gain materials for many laser applications because they have high emission cross sections and, therefore, a high rate of stimulated emission. These materials are also capable of generating a linearly polarized beam without introducing separate polarization compensation. In addition, the anisotropic gain medium can be implemented with suitable optics to correct thermal lensing and reduce thermal lens effects, without ancillary compensation, to ensure there is less degradation of laser modes when passing through the gain medium.

With these advantages, preferred embodiments of an optical power amplifier that incorporates an anisotropic gain medium can achieve power scaling with multiple passes while also maintaining good mode matching between the laser and the pump during each pass. The present disclosure emphasizes efficiency of the amplifier and quality of the amplified beam in properly matching a pumping light mode and a seed laser mode. Preferred embodiments are capable of maintaining a beam with substantially zero displacement, which leads to greater efficiency, and provide an economical, reliable solution that achieves high power TEM$_{00}$ output to meet the demands of micromachining, via drilling, and harmonic conversion applications.

When constructing a laser amplifier including Nd:YVO$_4$, or other anisotropic gain material, neither compensating for thermal birefringence nor undesired lasing is a main concern, as indicated by the placement and configuration of optical components in multiple pass amplifiers. Data from amplifier experiments involving anisotropic laser gain media further support this conclusion. Data for Nd:YVO$_4$ suggest that a strong seed laser beam impinging upon anisotropic Nd:YVO$_4$ may be amplified along the a-axis, but at a magnitude of about 3-4 times less than that along the c-axis.

Additional aspects and advantages will be apparent from the following detailed description of preferred embodiments, which proceeds with reference to the accompanying drawings.

BRIEF DESCRIPTION OF THE DRAWINGS

FIG. 4A-1 illustrates the law of reflection in relation to a laser beam incident on and reflected by a curved reflective surface.

DETAILED DESCRIPTION OF PREFERRED EMBODIMENTS

Materials suitable for general use as anisotropic gain media in multi-pass configurations are solid state media such as, but not limited to, rare-earth ion-doped crystalline solid state material including $Nd:YVO_4$, Nd:YLF, $Nd:GdVO_4$, Tm:YLF, $Tm:YVO_4$, Ho:Tm:YLF, $Ho:Tm:YVO_4$, $Ho:Tm:GdVO_4$, Yb:YLF, $Yb:YVO_4$, $Yb:GdVO_4$; Cr:LiSAF; Cr:LiCAF; Ti:Sapphire; alexandrite; other Nd-doped materials; and other materials comprising YLF, $YVO_4$, and $GdVO_4$ crystal hosts. Certain semiconductors may also be used as gain media, and optical or electrical pumping may also be employed. Each of the materials listed above has the ability to support light beam amplification at one or more wavelengths. Various pump laser wavelengths may be chosen to improve the conversion efficiency of a gain medium, for example, $Nd:YVO_4$ at pump wavelengths of 808 nm, 819 nm, 880 nm, 888 nm, and 914.5 nm. The laser may be either end pumped or side pumped. A seed laser suitable for solid-state amplifiers, such as a fiber laser, laser diode, solid-state laser, mode lock laser, or single laser mode (SLM) laser can be a source of a multi-pass amplifier.

Figure 3:
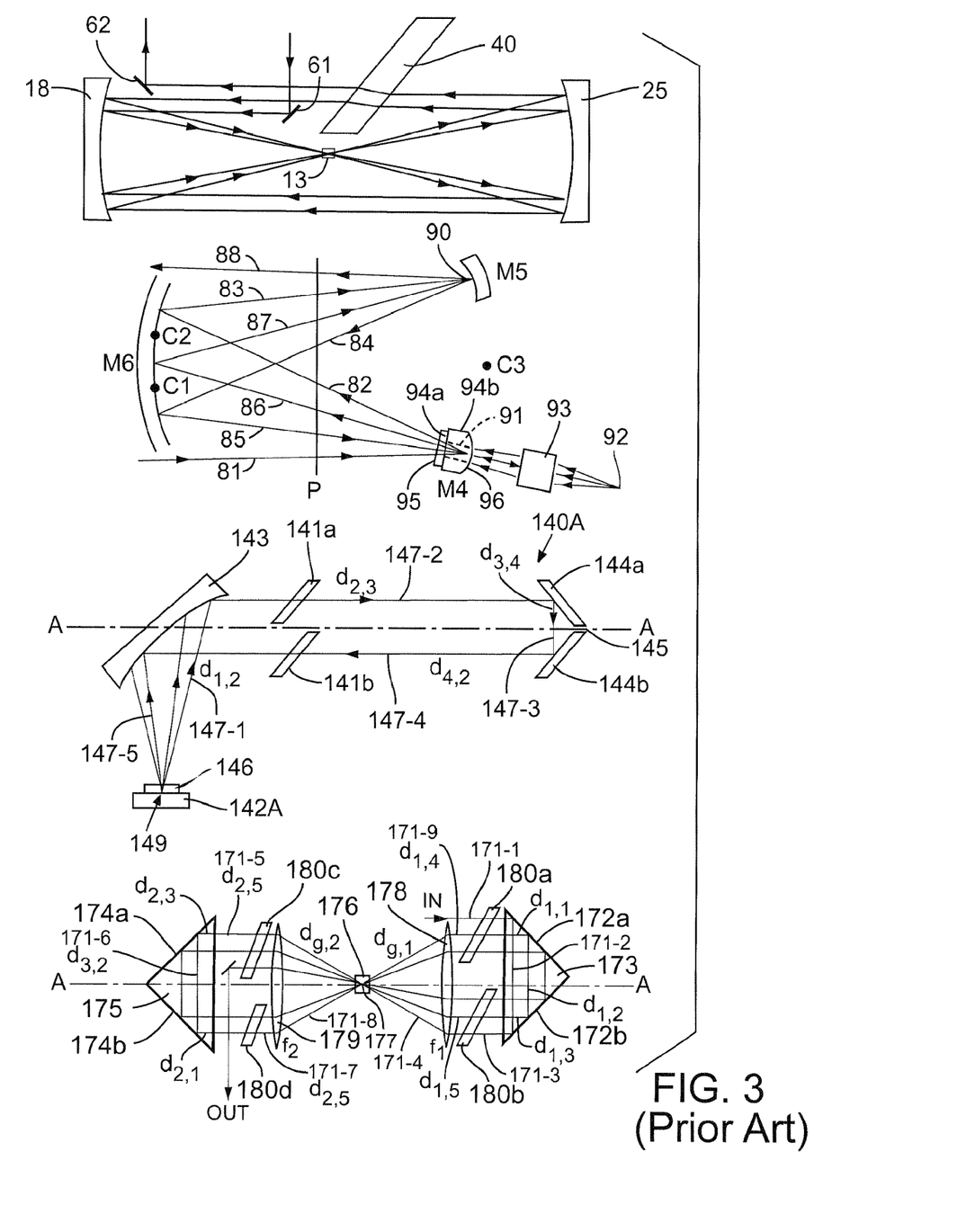
FIG. 3 is a collection of ray diagrams of four embodiments of a prior art multi-pass amplifier design described by Plaessmann et al.
Figure 4A:
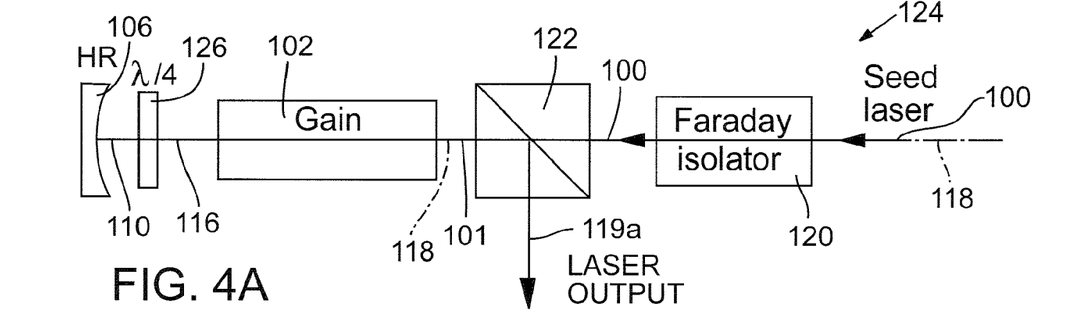
FIGS. 4A, 4B, and 4C are implementations of, respectively, double-, triple-, and quadruple-pass amplifiers.
Figure 4A:
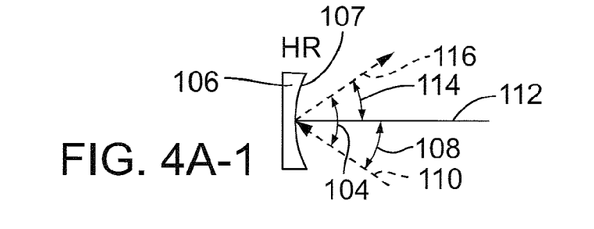
Figure 4B:
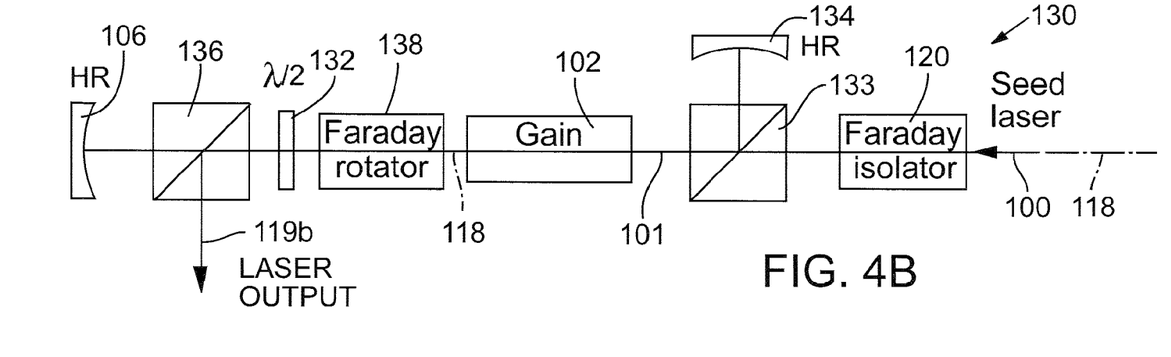
Figure 4C:
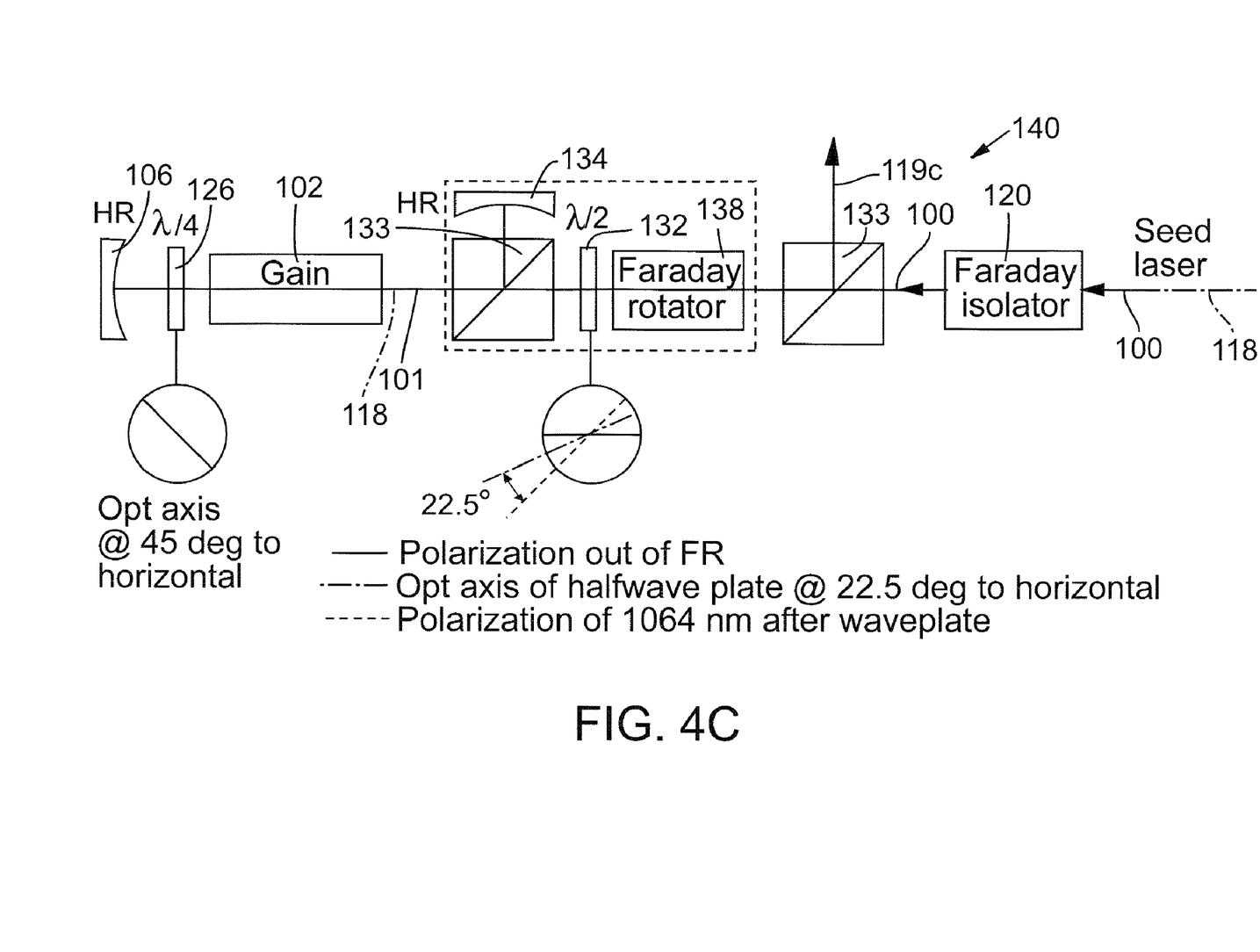

FIGS. 4A, 4B, and 4C show embodiments of a multi-pass optical amplifier in, respectively, double-pass, triple-pass, and quadruple-pass configurations. Each of these embodiments allows for multiple passes of a seed laser beam 100 along a common beam path 101 through an anisotropic gain medium 102 with substantially zero angular beam displacement 104 (FIG. 4A-1) from beam path 101 during each pass. In contrast to the prior art configurations that are shown in FIG. 3 and entail non-specular reflection, in each of the multi-pass configurations of FIGS. 4A, 4B, and 4C, seed laser beam 100, when incident on a curvilinear HR mirror 106, is perpendicular to a concave surface 107 of the mirror. With reference to FIG. 4A-1, according to the law of reflection, in general, the angle of incidence 108 of an incident beam 110, measured with respect to a surface normal 112, equals the angle of reflection 114 of a reflected beam 116. The angle between reflected beam 116 and incident beam 110 defines angular beam displacement 104. For normal incidence, in which angle of incidence 108 is 0°, reflected beam 116 retraces beam path 101 of incident beam 110, resulting in substantially zero angular beam displacement 104, or equivalently resulting in alignment between incident and reflected beams. The alignment of beams 110 and 116 facilitates control of beam propagation in gain medium 102 and ensures a good mode match between the lasing mode and the pump mode.

The double-, triple-, and quadruple-pass configurations of FIGS. 4A, 4B, and 4C, respectively, and employing anisotropic gain medium 102 illustrate a substantially zero angular beam displacement 104 of beam path 101 of seed laser beam 100 with respect to an optic axis 118. That is, seed laser beam 100 travels and retraces its path in opposite directions generally along optic axis 118 and exits the optical amplifier system as an output laser beam 119a, 119b, or 119c in a direction perpendicular to optic axis 118. In each configuration, seed laser beam 100 first passes through a Faraday isolator 120 and is incident on a polarizing beam splitter 122 (FIGS. 4A and 4C) or 133 (FIG. 4B) that either allows seed laser beam 100 to pass through polarizing beam splitter 122 or 133 or deflects seed laser beam 100 by 90°, according to the polarization direction of the beam and the orientation of the optics within the beam splitter. Various optical components positioned around gain medium 102 direct laser beam 100 through gain medium 102 for the requisite number of consecutive passes before output laser beam 119a, 119b, or 119c exits the optical amplifier system.

A double-pass configuration 124 shown in FIG. 4A includes a quarter-wave plate 126 placed between gain medium 102 and curvilinear HR mirror 106. Seed laser beam 100 emerging from Faraday isolator 120 first passes through polarizing beam splitter 122, through gain medium 102, and then through quarter-wave plate 126. Reflecting from curvilinear HR mirror 106, now-amplified laser beam 100 passes back through quarter-wave plate 126. Quarter-wave plate 126 has an optical axis oriented at an angle of 45° relative to the polarization direction of linearly polarized light emerging from gain medium 102. The purpose of quarter-wave plate 126 is to rotate the polarization direction of the amplified seed laser beam by a total of 90° for the two passes. The rotated linearly polarized light then passes through gain medium 102 a second time and is separated by polarizing beam splitter 122 before exiting the optical system as output laser beam 119a. Double-pass configuration 124 is not implemented with a Faraday rotator and, therefore, differs from prior art designs that are intended to compensate for thermally induced birefringence. Such compensation is unnecessary in double-pass configuration 124 because it is implemented with anisotropic gain medium 102.

A triple-pass configuration 130 shown in FIG. 4B includes a half-waveplate 132 as a substitute for quarter-wave plate 126 used in double-pass configuration 124; a polarizing beam splitter 133 as a substitute for polarizing beam splitter 122; and as added components a second curvilinear HR mirror 134, a second polarizing beam splitter 136, and a Faraday rotator 138. Seed laser beam 100 emerging from Faraday isolator 120 first passes through polarizing beam splitter 133 and gain medium 102. Laser beam 100 then passes through Faraday rotator 138, half-wave plate 132, and second polarizing beam splitter 136, reflects from curvilinear HR mirror 106, and passes back through each optical component of the system until laser beam 100 encounters first polarizing beam splitter 133, which deflects laser beam 100 by 90° so that it reflects off curvilinear HR mirror 134. Laser beam 100 then returns to first polarizing beam splitter 133, which reflects laser beam 100 back to gain medium 102 and then passes through Faraday rotator 138 and half-wave plate 132 a third time. Laser beam 100 is then deflected 90° by second polarizing beam splitter 136 and exits as output laser beam 119b.

A quadruple-pass configuration 140 shown in FIG. 4C includes components of triple-pass configuration 130, rearranged, with the addition of quarter-wave plate 126. Seed laser beam 100 emerging from Faraday isolator 120 first passes through polarizing beam splitter 122, Faraday rotator 138, and half-wave plate 132. After propagating through polarizing beam splitter 133, laser beam 100 travels back and forth between curvilinear HR mirrors 106 and 134 and thereby passes four times through gain medium 102 and quarter-wave plate 126. After the fourth pass through gain medium 102, laser beam 100 passes in reverse direction through polarizing beam splitter 133, through half-wave plate 132 and Faraday rotator 138, and toward polarizing beam splitter 122, and exits as output laser beam 119c.

A good mode match between seed laser and pump beams beneficially affords the possibility of achieving a high quality beam with highly efficient extraction. In addition, gain medium 102 can be configured in an end-pumping or in a side-pumping architecture. In the case of single laser mode (SLM) operation, curvilinear HR mirrors 106 and 134 can be replaced by phase conjugate cells to eliminate the need for lenses, because phase conjugation eliminates distortions in the amplifier. Furthermore, there is no undesired lasing action in the amplifier disclosed. Instead, curvilinear HR mirrors 106 and 134 are designed to achieve good mode matching and to improve amplified beam quality.

A preferred embodiment of the multi-pass configuration resembles a diode-pumped vanadate (Nd:YVO$_4$) power amplifier. Although Nd:YVO$_4$ has anisotropic gain, it can still be used for this multi-pass scheme because Nd:YVO$_4$ crystals are capable of lasing when the polarization direction of laser beam 100 is aligned with either the a-axis or the c-axis. When the polarization direction of laser beam 100 is aligned with the c-axis, the gain is about three times greater than the gain when the polarization direction of laser beam 100 is aligned with the a-axis. (This is the reason why the prior art primarily uses the c-axis for lasing.) The laser-related parameters of Nd:YVO$_4$ along the a- and c-axes are as follows, for 1% Nd doping concentration:

| | Emission cross section, ×10$^{-19}$ cm$^2$ | Fluorescence lifetime, μs |
|---|---|---|
| c-axis | 25 | 90 |
| a-axis | 7 | 90 |

Figure 5A:
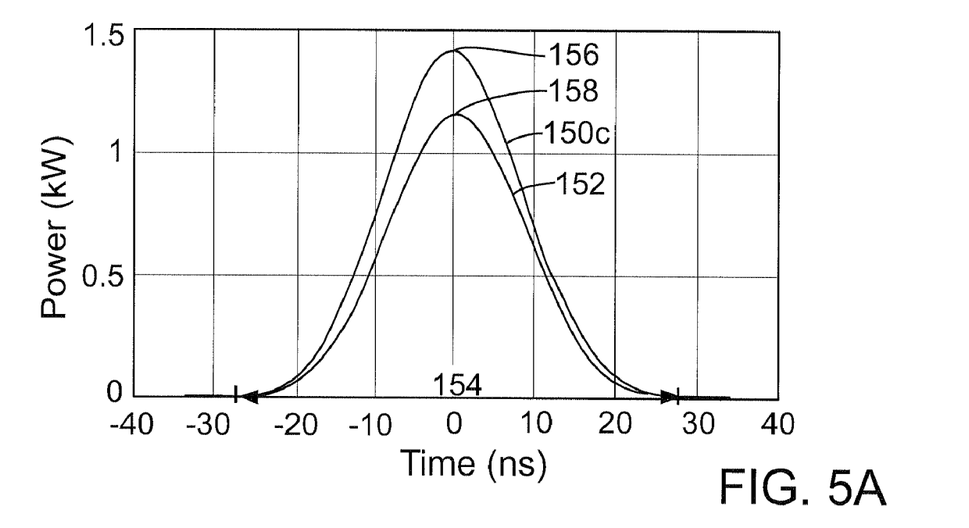
FIGS. 5A, 5B, 5C, and 5D are plots of simulated seed power and output power as a function of time for the c-axis and a-axis of a gain medium of a single-pass amplifier configuration, one double-pass a-c configuration, and one c-a-a-c quadruple-pass configuration, respectively, with seed laser parameters set at 100 kHz PRF, 20 ns pulse width (PW), and 3 W absorbed pump power.
Figure 5B:
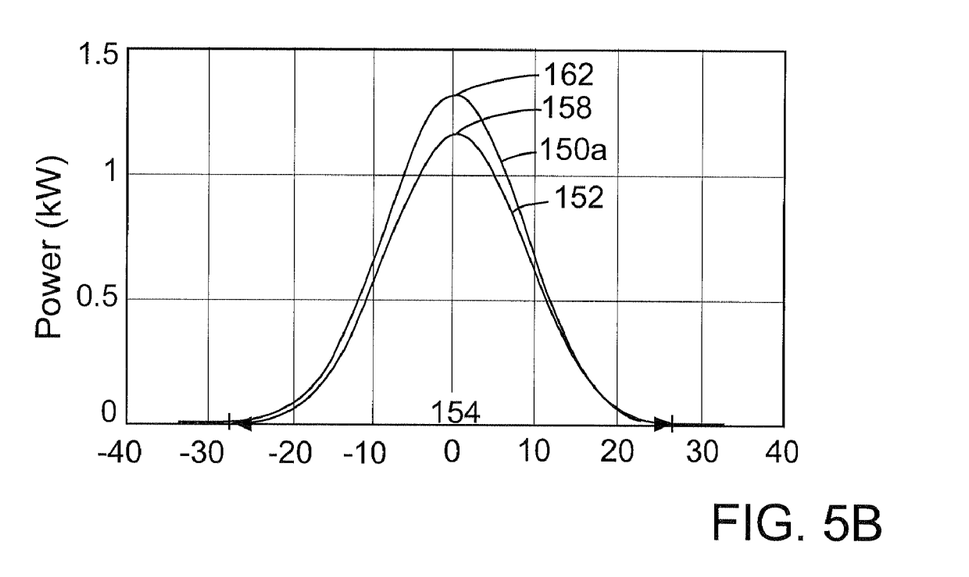

A numerical model was designed and developed to simulate amplification in a Nd:YVO$_4$ crystal along its a- and c-axes. Simulation results comparing amplification along the c- and a-axes are shown in FIGS. 5A and 5B, respectively, for a single-pass amplifier. Both the simulations and an experiment (presented below) include the following common parameter settings: 100 kHz PRF, 20 ns PW, and 3 W absorbed pump power. Peak power levels are in the kW range while average power values are on the order of 1 W-10 W. FIG. 5A shows a curve 150c that represents the time evolution of single-pass c-axis power output and a curve 152 that represents seed laser power over a 50 ns time interval 154. Comparison of curves 150c and 152 reveals a single-pass c-axis peak power output 156 of 1.4 kW corresponding to a peak seed laser power 158 of 1.1 kW. The average power over a full 100 kHz cycle (equal to 10 μs or 10,000 ns) is calculated as 2.86 W and represents the single-pass c-axis energy emitted within the very short 50 ns time interval 154. FIG. 5B shows a curve 150a representing the corresponding time evolution of single-pass a-axis power output and curve 152 over the 50 ns time interval 154. Comparison of curves 150a and 150c reveals a peak single-pass a-axis power output 162 of 1.3 kW and average single-pass a-axis power output of 2.6 W. Corresponding extraction efficiencies show that amplification in the c-direction exceeds that in the a-direction by about a factor of three.

Figure 5C:
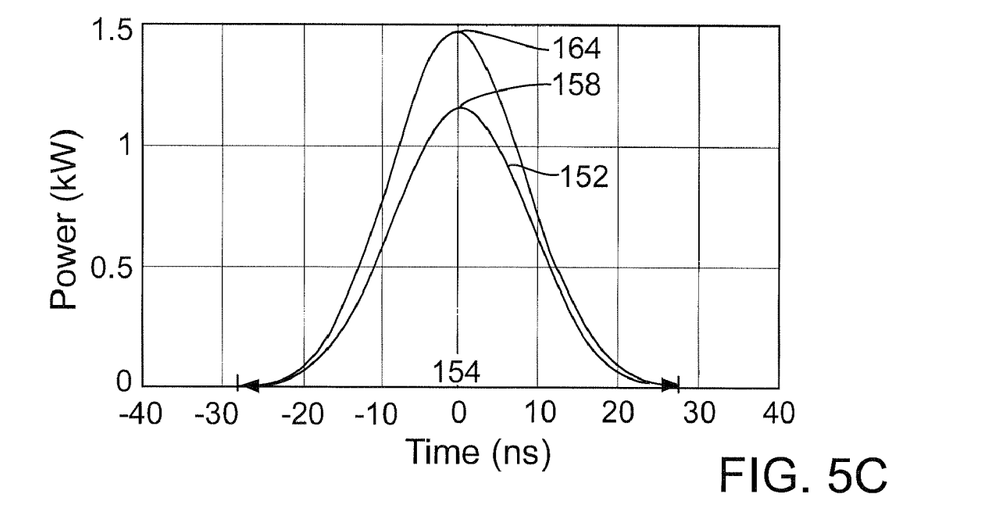
Figure 5D:
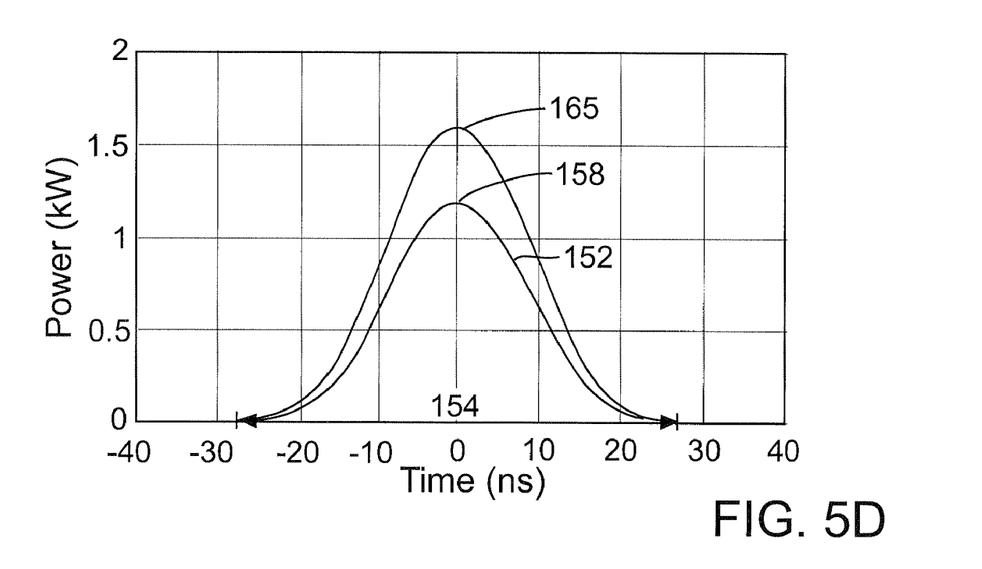

The progression from single-pass, to double-pass, and to quadruple-pass power amplifiers entails sequentially higher extraction efficiencies and corresponding c-axis output powers for the same values of pump power and seed power. Extrapolating from the 12.4% single-pass extraction efficiency along the c-axis corresponding to single-pass amplifier results in FIG. 5A, the simulation predicts an a-c double-pass amplifier 124 to have 15.5% extraction efficiency and 3.0 W average output power (FIG. 5C) corresponding to 1.45 kW peak output power 164, and a c-a-a-c quadruple-pass amplifier 140 to have 23.0% extraction efficiency and 3.2 W average output power corresponding to 1.6 kW peak output power 165 (FIG. 5D).

Figure 6A:
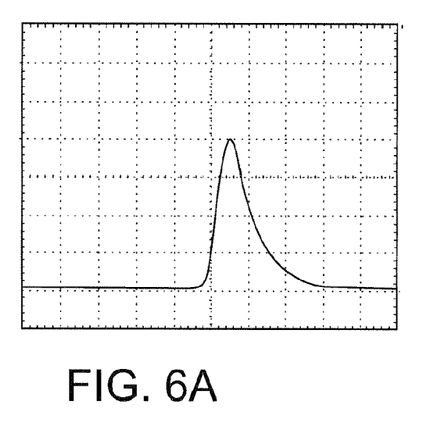
FIGS. 6A and 6B are plots of measured seed power and output power levels achieved using an experimental single-pass amplifier with pump power applied.
Figure 6B:
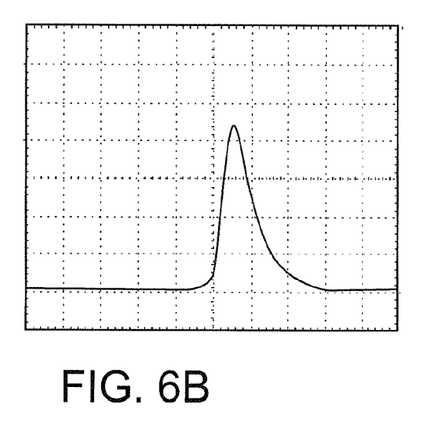

Simulation results for the single-pass amplifier agree well with experimental results of single-pass amplification along the c-axis shown in FIG. 6A and FIG. 6B. FIGS. 6A and 6B display the outcome of a power amplifier experiment conducted using a 2.5 W average power seed laser at 1064 nm pulsed at 100 kHz PRF with a 20 ns PW to calibrate the numerical model. The laser beam spot size was 250 μm, and the pump beam spot size at the beam waist was 280 μm. The 808 nm pump source was a fiber-coupled laser diode with 100 μm diameter and a numerical aperture (NA) of 0.22. The experiment resulted in absorption of 3 W of pump power at 808 nm by a Nd:YVO$_4$ crystal. Using a single-pass amplifier configuration based on this power amplifier experiment, 2.8 W average output power was produced with the laser polarization direction aligned with the c-axis, and 2.6 W average output power was produced with the laser polarization direction aligned with the a-axis. A 3 W average output power can be expected from a double-pass configuration, based on the disclosed power amplifier model.

Figure 7:
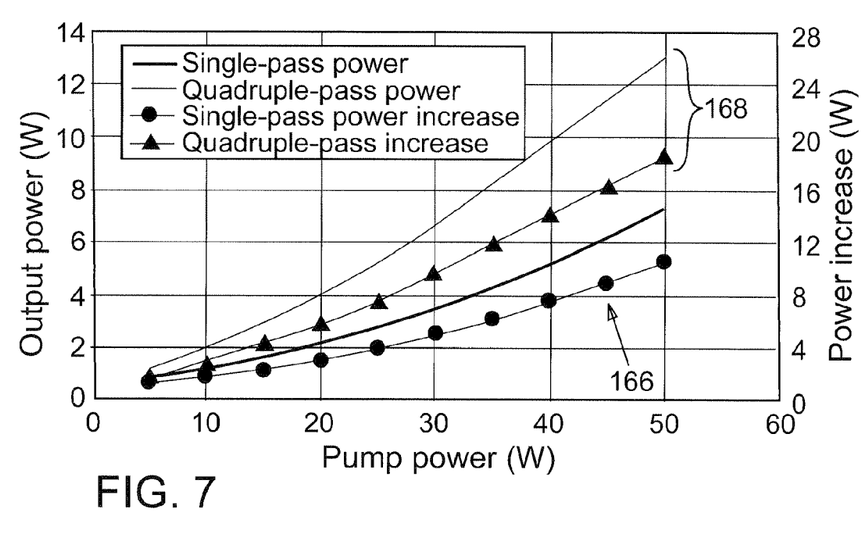
FIG. 7 is a plot of simulated output power (increase) as a function of pump power for a single-pass amplifier and a quadruple-pass amplifier with parameters equal to those used in FIG. 6.
Figure 8A:
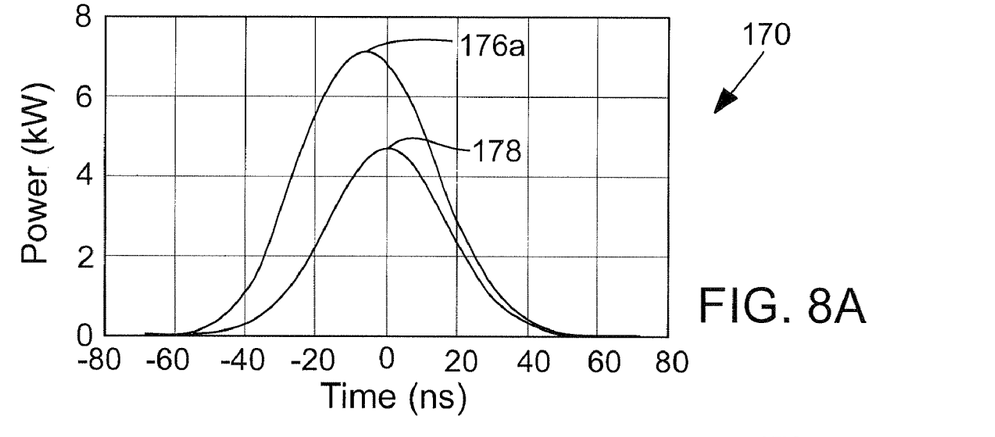
FIGS. 8A, 8B, 8C, and 8D are plots of simulated power output as a function of time after each successive pass of a seed laser beam through a quadruple-pass power amplifier configuration, with seed laser parameters set at 20 W power, a 40 ns pulse width, and 50 W measured total absorbed pump power.
Figure 8B:
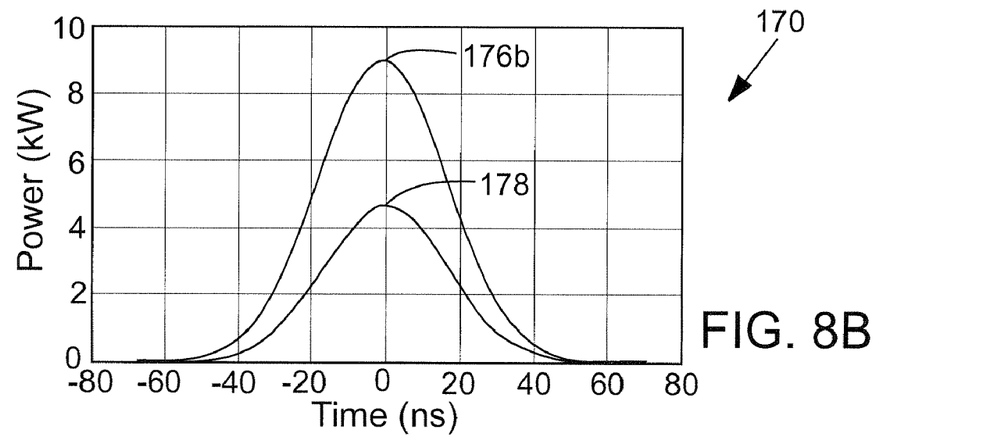
Figure 8C:
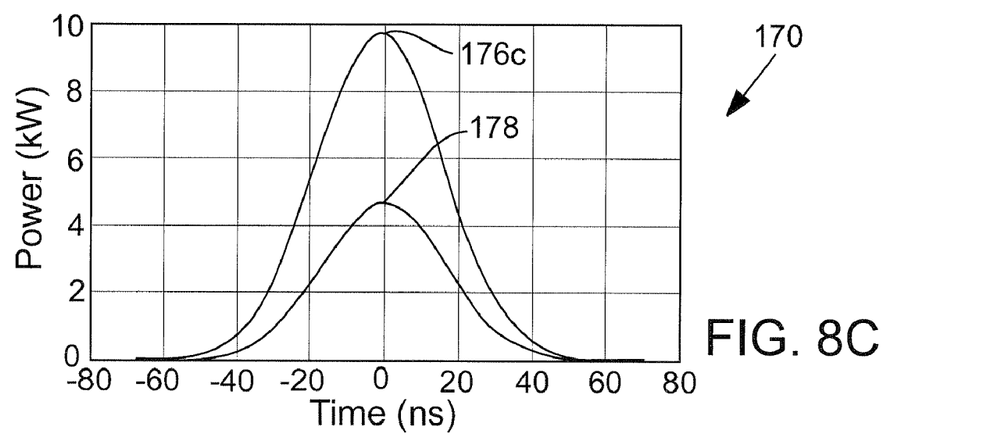
Figure 8D:
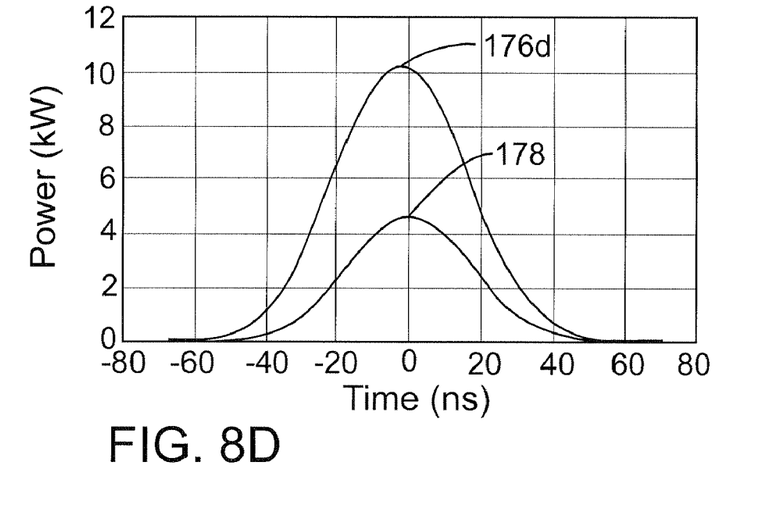

Using a 0.7 W seed laser pulsed at 100 kHz, with a 20 ns PW, a laser beam spot diameter of 350 μm and a pump beam spot diameter of 380 μm, a simulation was run for both a single-pass amplifier and a quadruple-pass amplifier, showing output power and gain as a function of pump power, respectively. Results presented in FIG. 7 indicate a roughly linear relationship 166 for both configurations, with a much steeper increase 168 with pump power for the case of the quadruple-pass amplifier.

The multi-pass power amplifier designs implemented in the embodiments of FIGS. 4A, 4B, and 4C are also suitable for high-power applications on the order of tens of Watts. A seed laser beam 100 with 20 W average power at 100 kHz PRF and a 40 ns PW passes through the gain medium, which absorbs a total of 50 W of pump power at a 808 nm pump wavelength. The laser beam spot size is 550 μm, and the pump beam spot size is 580 μm. Simulation results 170 for the high-power application are given in FIGS. 8A, 8B, 8C, and 8D. The extraction efficiency of a single-pass configuration along the c-axis is 22.9%, producing 31.4 W average power output, increasing to 44.4% efficiency using a c-a-a-c quadruple-pass amplifier like configuration 140, with average output power of 42.2 W. The high-power amplifier of FIGS. 8A, 8B, 8C, and 8D produces peak power levels 176a, 176b, 176c, and 176d that are approximately 2-3 times greater than the seed laser peak power 178 (about 7 kW-10 kW produced from about 4.5 kW).

Figure 9:
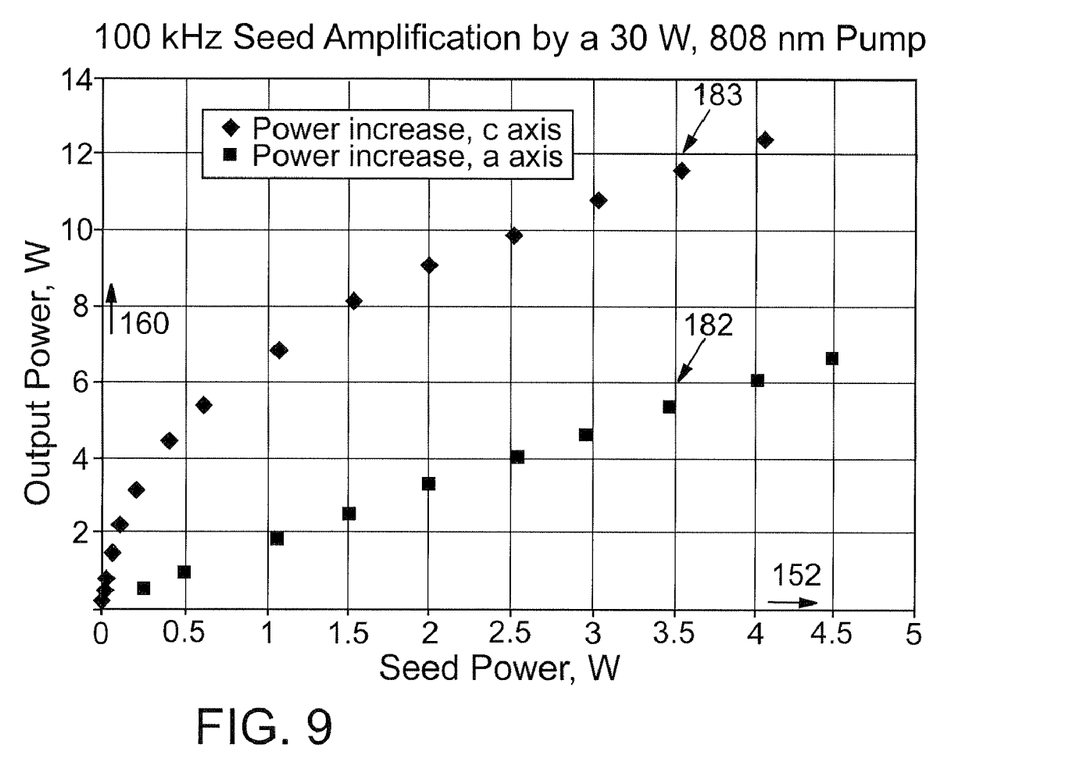
FIG. 9 is a plot of measured power amplification of a 100 kHz seed laser, as indicated by output power as a function of seed power along the c- and a-axes of a vanadate crystal pumped with 30 W at a wavelength of 808 nm.

Output power as a function of seed power is shown in FIG. 9, in which a distinction between a-axis amplification 182 and c-axis amplification 183 is apparent. As seed laser power 152 increases, power output 160 increases dramatically, especially in the case of a quadruple-pass configuration, and especially when seed laser beam 100 is directed along the c-axis of the vanadate crystal.

When it is necessary to compensate for thermally induced birefringence, such as in prior art systems, a multi-pass amplifier configuration is limited to an even number of passes, in which the polarization states of the light beam traveling back and forth through the gain medium must be orthogonal. Consequently, on the first pass, if the beam is polarized along the c-axis, it must be polarized along the a-axis on the second pass. Only a-c or c-a configurations would be allowed for a double-pass amplifier, and only a-c-c-a or c-a-a-c configurations would be allowed for a quadruple-pass amplifier. However, with an anisotropic medium such as vanadate, ancillary compensation for thermally induced birefringence is not needed, allowing for more freedom in the amplifier design.

Figure 10:
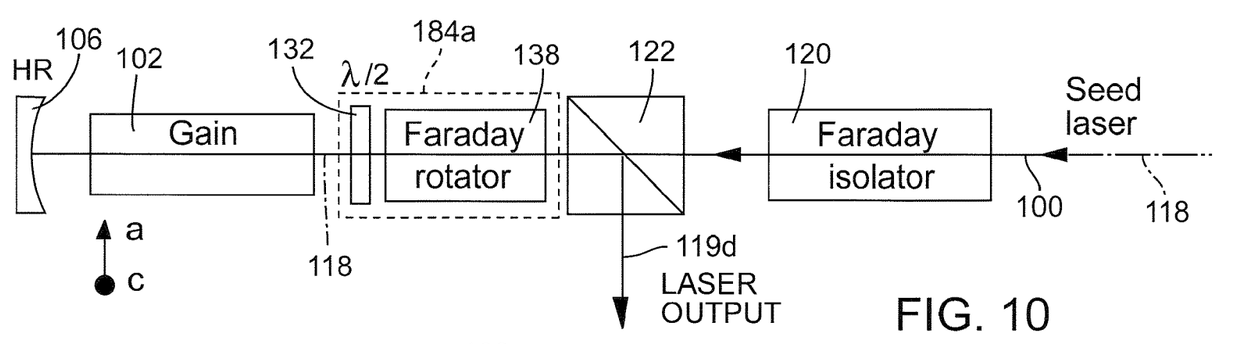
FIG. 10 is a diagram of a preferred embodiment in a-a or c-c double-pass power amplifier configuration.
Figure 11:
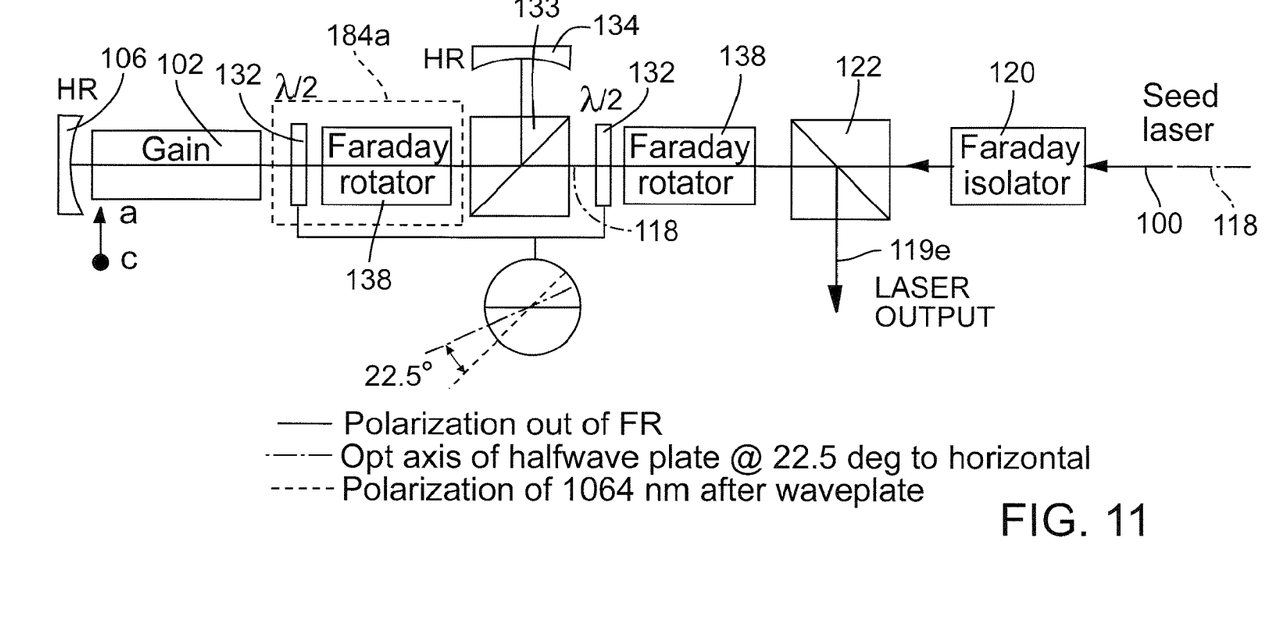
FIG. 11 is a diagram of a preferred embodiment in a-a-c-c or c-c-a-a quadruple-pass power amplifier configuration.

FIGS. 10, 11, 12, and 13 are diagrams of alternative embodiments of multi-pass amplifiers shown in FIGS. 4A, 4B, and 4C and implemented with anisotropic gain media, thus allowing for variation in the order of passes along the c-axis and a-axis. Optical components in these embodiments are arranged so as to take advantage of the properties of the anisotropic gain media. Specifically, in the first couple of passes, the seed laser beam polarization direction is aligned to the crystal axis of the vanadate gain material yielding the greatest emission cross section (c-axis), before it is aligned to the a-axis. Additional double-pass configurations such as a-a or c-c become possible (FIG. 10), as well as quadruple-pass configurations such as a-a-c-c or c-c-a-a (FIG. 11). FIG. 10 shows a double-pass configuration similar to that shown in FIG. 4A, except that a Faraday rotator 138 and a half-wave plate 132 within a first dashed line box 184a have been added upstream of gain medium 102, and quarter-wave plate 126 next to curvilinear HR mirror 106 in FIG. 4A has been removed. The same two modifications were made to the quadruple-pass configuration shown in FIG. 4C to form the configuration in FIG. 11.

Figure 12:
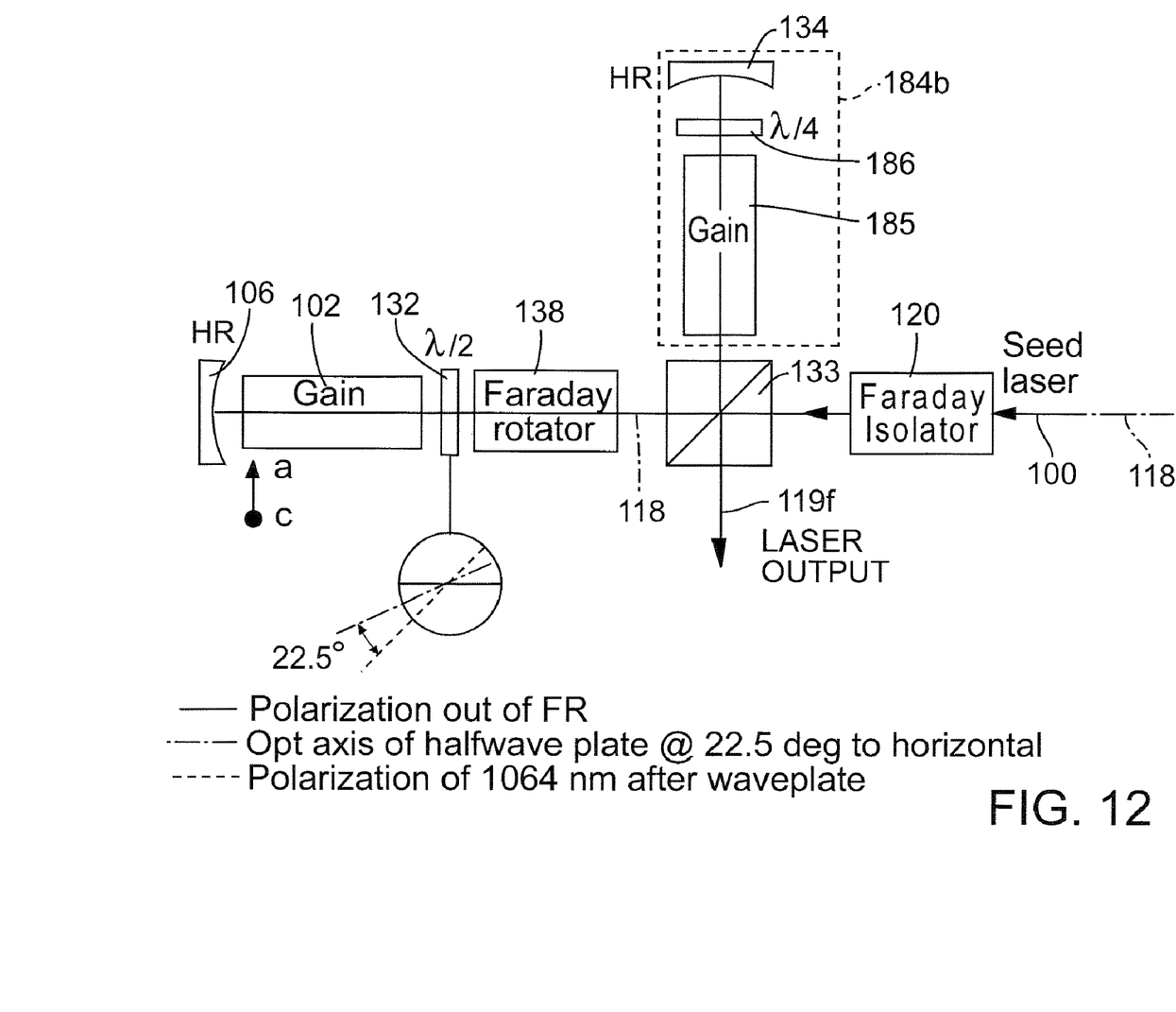
FIG. 12 is a diagram of a preferred embodiment in c-c-a-a or a-a-a-c quadruple-pass power amplifier configuration.

The quadruple-pass configuration shown in FIG. 12 is based on the double-pass configuration in FIG. 10, with added optical components shown in a second dashed line box 184b. A second gain medium 185 is inserted between polarizing beam splitter 122 and a second curvilinear HR mirror 134, along with a second quarter-wave plate 186. The beam therefore passes twice through each of gain medium 102 and gain medium 185, for a total of four passes.

Figure 13:
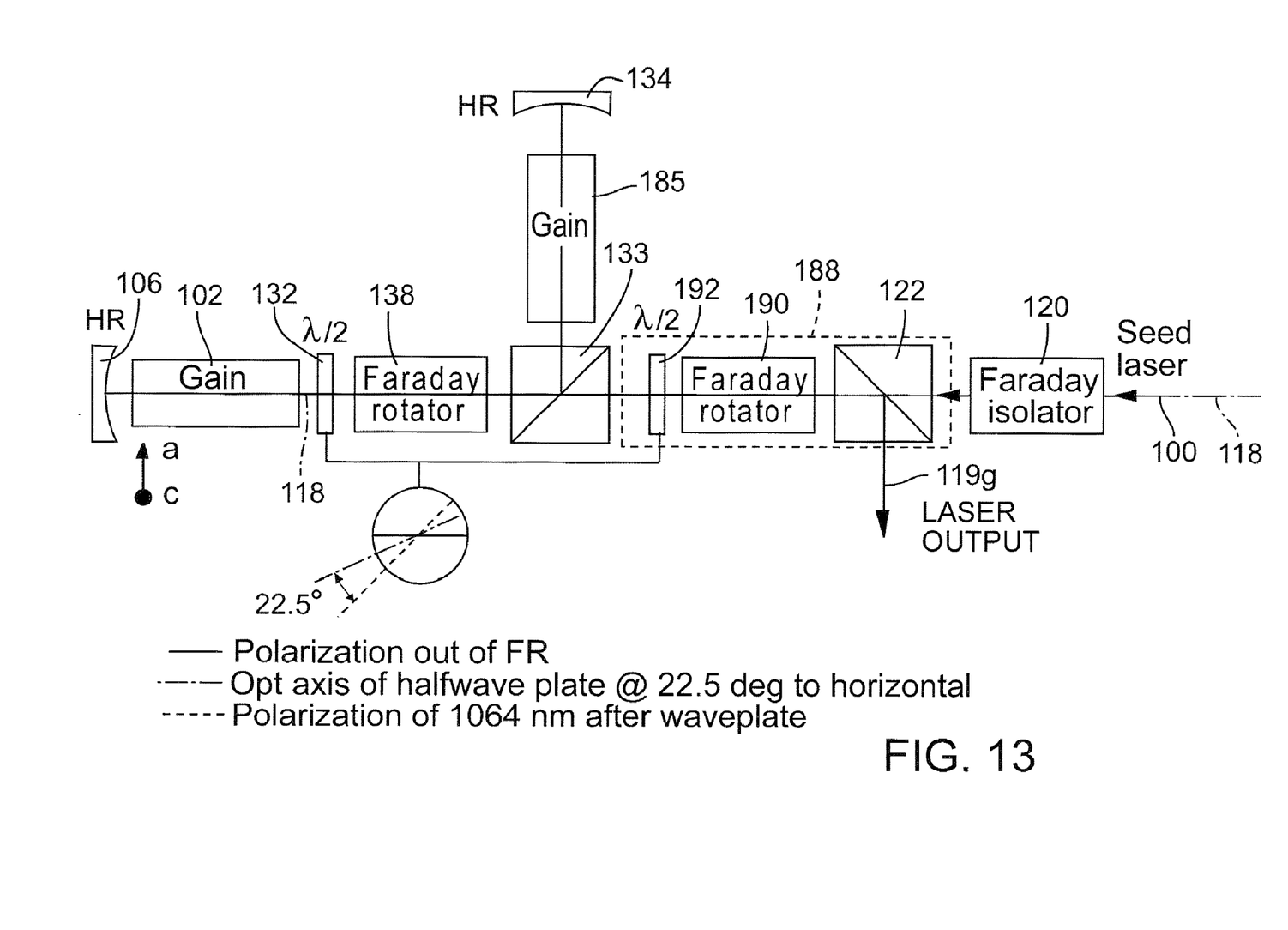
FIG. 13 is a diagram of a preferred embodiment in c-c-c-c-a-a and a-a-a-a-c-c six-pass power amplifier configuration.

FIG. 13 represents a configuration for an even more efficient, six-pass amplifier, which is the same as the quadruple-pass configuration of FIG. 12 that includes second gain medium 185, except for an additional block of three optical components shown enclosed in a third dashed line box 188. The additional optical components include a second polarizing beam splitter 122, a second Faraday rotator 190, and a second half-wave plate 192 inserted in the beam path just after Faraday isolator 120, with second quarter-wave plate 186 removed.

It will be obvious to those having skill in the art that many changes may be made to the details of the above-described embodiments without departing from the underlying principles of the invention. The scope of the present invention should, therefore, be determined only by the following claims.

The invention claimed is:

1. A method of configuring a multi-pass optical power amplifier to perform polarization-dependent amplification of laser energy to produce laser output with reduced beam distortion, comprising:

providing an anisotropic gain medium comprising a rare-earth ion-doped crystalline solid state material having first and second orthogonally related gain axes characterized by inherent differential axial gain and associated inherent differential thermal birefringence;

guiding a polarized seed laser beam for multiple passes through the anisotropic gain medium, the seed laser beam for each of the multiple passes propagating along a common beam path and undergoing substantially no displacement from the common beam path, and the seed laser beam having a polarization direction transverse to the common beam path; and coordinating alignment of the polarization direction of the polarized seed laser beam with the first and second gain axes of the gain medium to establish a number of the multiple passes through the gain medium by passing the polarized seed laser beam multiple times through a beam splitter and producing a laser output beam exiting the beam splitter;

whereby the seed laser beam undergoing substantially no displacement from the beam path reduces laser output beam distortion and the inherent differential thermal birefringence enhances laser output energy extraction efficiency.

2. The method of claim 1, in which the rare-earth ion-doped crystalline solid state material includes $Nd:YVO_4$, $Nd:YLF$, $Nd:GdVO_4$, $Tm:YLF$, $Tm:YVO_4$, $Ho:Tm:YLF$, $Ho:Tm:YVO_4$, $Ho:Tm:GdVO_4$, $Yb:YLF$, $Yb:YVO_4$, or $Yb:GdVO_4$.

3. The method of claim 1, in which the anisotropic gain medium is a crystalline solid state material in the shape of a cylindrical rod of circular cross section.

4. The method of claim 1, in which the anisotropic gain medium is a crystalline solid state material in the shape of a cylindrical rod of polygonal cross section.

5. The method of claim 4, in which the polygonal cross section of the cylindrical rod is square.

6. The method of claim 4, in which the polygonal cross section of the cylindrical rod is hexagonal.

7. A method of configuring a multi-pass optical power amplifier to perform polarization-dependent amplification of laser energy to produce laser output with reduced beam distortion, comprising:

providing an anisotropic gain medium comprising a rare-earth ion-doped crystalline solid state material having first and second orthogonally related gain axes characterized by inherent differential axial gain and associated inherent differential thermal birefringence, and the rare-earth ion-doped crystalline solid state material including $Nd:YVO_4$, $Nd:YLF$, $Nd:GdVO_4$, $Tm:YLF$, $Tm:YVO_4$, $Ho:Tm:YLF$, $Ho:Tm:YVO_4$, $Ho:Tm:GdVO_4$, $Yb:YLF$, $Yb:YVO_4$, or $Yb:GdVO_4$;

guiding a polarized seed laser beam for multiple passes through the anisotropic gain medium, the seed laser beam for each of the multiple passes propagating along a common beam path and undergoing substantially no displacement from the common beam path, and the seed laser beam having a polarization direction transverse to the common beam path; and coordinating alignment of the polarization direction of the polarized seed laser beam with the first and second gain axes of the gain medium to establish a number of the multiple passes through the gain medium and produce a laser output beam;

whereby the seed laser beam undergoing substantially no displacement from the beam path reduces laser output beam distortion and the inherent differential thermal birefringence enhances laser output energy extraction efficiency.

8. The method of claim 7, in which the anisotropic gain medium is a crystalline solid state material in the shape of a cylindrical rod of circular cross section.

9. The method of claim 7, in which the anisotropic gain medium is a crystalline solid state material in the shape of a cylindrical rod of polygonal cross section.

10. The method of claim 9, in which the polygonal cross section of the cylindrical rod is square.

11. The method of claim 9, in which the polygonal cross section of the cylindrical rod is hexagonal.

12. A method of configuring a multi-pass optical power amplifier to perform polarization-dependent amplification of laser energy to produce laser output with reduced beam distortion, comprising:

providing an anisotropic gain medium including Cr:LiSAF, Cr:LiCAF, Ti:Sapphire, or alexandrite, and having first and second orthogonally related gain axes characterized by inherent differential axial gain and associated inherent differential thermal birefringence;

guiding a polarized seed laser beam for multiple passes through the anisotropic gain medium, the seed laser beam for each of the multiple passes propagating along a common beam path and undergoing substantially no displacement from the common beam path, and the seed laser beam having a polarization direction transverse to the common beam path; and coordinating alignment of the polarization direction of the polarized seed laser beam with the first and second gain axes of the gain medium to establish a number of the multiple passes through the gain medium and produce a laser output beam;

whereby the seed laser beam undergoing substantially no displacement from the beam path reduces laser output beam distortion and the inherent differential thermal birefringence enhances laser output energy extraction efficiency.

13. The method of claim 12, in which the anisotropic gain medium is a crystalline solid state material in the shape of a cylindrical rod of circular cross section.

14. The method of claim 12, in which the anisotropic gain medium is a crystalline solid state material in the shape of a cylindrical rod of polygonal cross section.

15. The method of claim 14, in which the polygonal cross section of the cylindrical rod is hexagonal.

16. The method of claim 14, in which the polygonal cross section of the cylindrical rod is square.

17. The method of claim 12, in which the coordinating the alignment of the polarization direction of the polarized seed laser beam includes passing the polarized seed laser beam multiple times through a beam splitter and causing exit of the laser output beam from the beam splitter.

\* \* \* \* \*